US006961812B2

(12) United States Patent
Bjork et al.

(10) Patent No.: US 6,961,812 B2
(45) Date of Patent: Nov. 1, 2005

(54) UNIVERSAL DISK FORMAT VOLUMES WITH VARIABLE SIZE

(75) Inventors: Thomas A. Bjork, Rochester, MN (US); Armin H. Christofferson, Rochester, MN (US); Leon E. Gregg, Rochester, MN (US); James L. Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/263,953

(22) Filed: Oct. 3, 2002

(65) Prior Publication Data

US 2004/0068635 A1 Apr. 8, 2004

(51) Int. Cl.$^7$ .......................... G06F 12/00; G11B 20/12
(52) U.S. Cl. ...................... 711/112; 369/47.1; 711/170
(58) Field of Search ............................ 711/4, 111, 112, 711/170, 171, 172; 369/47.1, 47.12, 47.13, 47.22

(56) References Cited

U.S. PATENT DOCUMENTS

| | | | | |
|---|---|---|---|---|
| 5,873,118 A | * | 2/1999 | Letwin | 711/156 |
| 6,185,575 B1 | * | 2/2001 | Orcutt | 707/200 |
| 6,715,030 B1 | * | 3/2004 | Vandenbergh et al. | 711/111 |

OTHER PUBLICATIONS

"Universal Disk Format Specification", Revision 2.01, Mar. 2000, Optical Storage Technology Association, pp. 1, 52, and 98.*

"Volume and File Structure for Write–Once and Rewritable Media using Non–Sequential Recording for Information Interchange" Standard ECMA–167 , 3$^{rd}$ Edition, Jun. 1997, pp. 1/4, 4/44, and 4/45.*

* cited by examiner

Primary Examiner—Gary Portka
(74) Attorney, Agent, or Firm—Moser, Patterson & Sheridan LLP

(57) ABSTRACT

The present invention provides methods and systems for creating and manipulating universal disk format (UDF) data structures having variable amounts of data. For some embodiments, a UDF data structure is formatted with a freespace bitmap field large enough to represent a first amount of data and an area adjacent the freespace bitmap field reserved to allow the freespace bitmap field to expand to represent a second amount of data greater than the first amount of data. The freespace bitmap field may be expanded to represent the second amount of data by increasing a freespace bitmap size field to represent an expanded freespace bitmap field and initializing the expanded portion of the freespace bitmap size field.

33 Claims, 10 Drawing Sheets

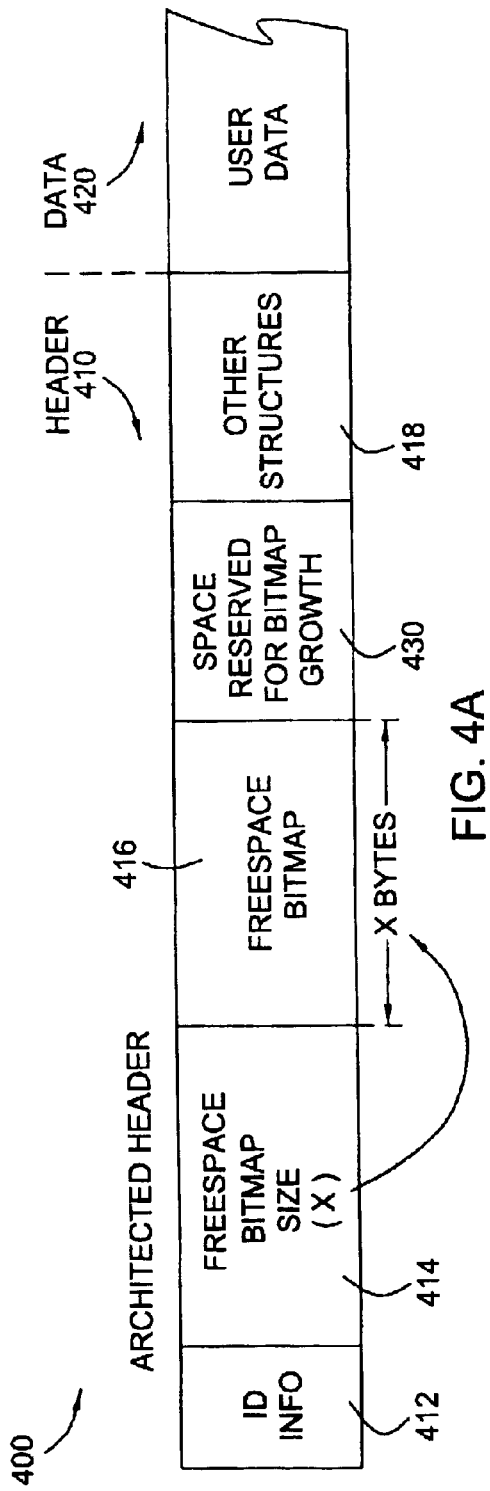
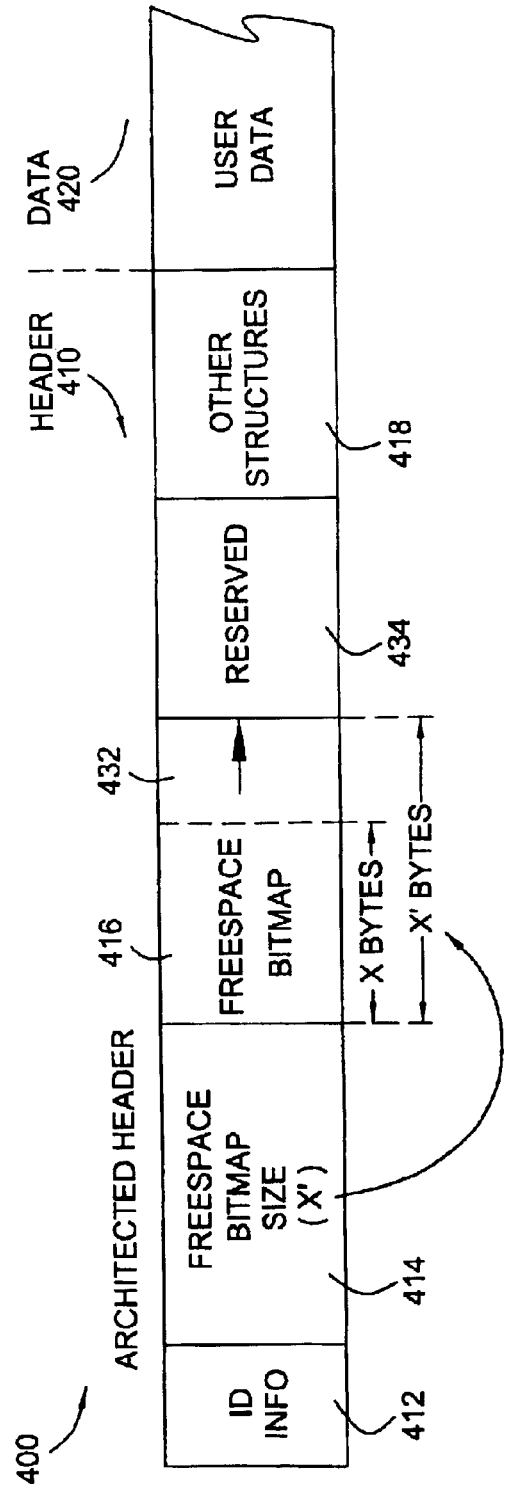

UNIVERSAL DISK FORMAT VOLUMES WITH VARIABLE SIZE

BACKGROUND OF THE INVENTION

1. Field of the Invention

The present invention generally relates to data structures for storing an amount of data, and more particularly, to universal disk format (UDF) data structures capable of storing an amount of data that is variable in size.

2. Description of the Related Art

Optical media are storage media that hold content in digital form and that are written to and read from by a laser. Optical media include the CD variations, such as CD-ROMs, CD-Rs, CD-R/Ws, as well as the DVD variations, such as DVD-ROMs, DVD-Rs, DVD-R/Ws and DVD-RAMs. Optical media have a number of advantages over magnetic media such as the floppy disk. Optical media currently have a capacity range of over 6 GB compared to 1.44 MB of a floppy disk. Durability is another feature of optical media. An optical disk typically lasts much longer than a magnetic media.

Due to the large variety of optical media, the large number of different manufacturers of optical media drives, and the different types of systems (from DVD players to different computing system platforms) that must access data stored on optical media, compatibility is a concern. To address this concern, the Optical Storage Technology Association (OSTA), a non-profit trade association actively promoting the use of writable optical technologies and products for storage of computer data and images, created the Universal Disk Format (UDF). UDF is a universal vendor-independent file system designed for data interchange and portability allowing an operating system to access (read/write/modify) data that was created by another operating system. It is a subset of an International Standards Organization (ISO) interchange standard for non-sequential recording of data, known as ISO 13346. UDF was developed by the OSTA as a means of ensuring consistency among data written to various optical media.

FIG. 1 illustrates an exemplary UDF data structure 100 which generally includes a header 110 and user data 120. As illustrated, the user data 120 may include data stored as files 122_1 to 122_N, each of which may span several sectors (124_1 to 124_M). Generally, a sector refers to the smallest accessible amount of storage on the medium, which is typically 2 kB for UDF data. Typically, files are assigned sequentially numbered sectors, to improve performance (i.e., access time). A UDF data structure may include files of the same type, such as video files of a movie stored on a DVD, as well as files of different types. For example, a DVD manufacturer or publisher may provide image files, for use as screensavers or wallpaper, along with video files of a movie, as an added bonus to the movie.

The header 110 is an architected descriptor generally containing an ID field 112, a bitmap size field 114, a freespace bitmap field 116 and various other structures 118. The other structures 118 may include various architected descriptors that contain information about the identification, attributes, and organization of the physical and logical volume of the data structure 100, as well as directory structure and files associated with the volume. Examples of other structures include a primary volume descriptor, logical volume descriptor, logical volume integrity descriptor, partition descriptor, file set descriptor, file identifier descriptor, and information control block.

The bitmap size field 114 indicates a size, in bytes, of the freespace bitmap field 116. The freespace bit-map field includes one bit to indicate the status of each sector on the media the file system can use. The possible values for the bits are "available" or "in-use". When an application is attempting to write to the media (e.g., directory information, user data, etc.) the file system goes to the freespace bitmap field 116 and finds the required number of sectors that are available on the media. Prior to writing on those sectors, corresponding bits in the freespace bitmap field 116 are changed (to "in-use") to indicate to a subsequent application the sectors are not available for writing data. Because each bit of the freespace bitmap field 116 represents one sector of the media, once the header is written to the media (i.e., the media is formatted for UDF), the size of the data amount is fixed. To increase the amount represented would require expansion of the freespace bitmap field 116, which would result in an associated expansion of the header 110 into the user data 120. As a result of this limitation, a number of difficulties arise when manipulating UDF data.

For example, one difficulty arises when attempting to copy an amount of UDF data from a source medium to a target medium of greater capacity (e.g., copying from a CD-ROM to a DVD RAM). Methods for copying an amount of UDF data generally fall into two categories: sector copying and file copying. Sector copying generally includes initializing the first sector address and reading sectors of data from the source and writing sectors of data to the target from the first sector to the last. Because sectors of data are accessed sequentially and only once, sector copying is generally fast and efficient. However, sector copying is typically limited to source and target media of the same capacity and same sector size. This is because sector copying routines typically copy all the sectors (including file system with information specifying media capacity) from the source medium to the target medium sequentially, beginning with the first sector. In other words, the copied media capacity information will be inconsistent with the actual capacity of the target medium.

File copying, on the other hand, is not limited to source and target media of the same capacity and sector size. File copying generally includes identifying a first file to be copied from the source medium, opening the file on the source medium for reading, opening a file on the target medium for writing and copying data from the file on the source medium to the file on the target medium (media capacity information is not copied). Once all the data is copied, the files are closed on the source and the target media. However, the seemingly simple operations of opening and closing the files on the source and target media involve traversing a file system directory structure to access files scattered across the source and target media. Accordingly, this approach may suffer a disadvantage in performance when compared to sector copying, and is generally unacceptable for copying a large number of files.

Another difficulty that arises as a result of a UDF data structure having a fixed capacity occurs when a user creates a virtual media using the UDF. In general, a virtual medium has the quality of appearing to be one type of medium while residing on another type of medium. For example, a user may create a virtual UDF medium on a direct access storage device (DASD), such as a hard drive. The virtual UDF medium may appear to the user as a regular physical medium (e.g., a DVD), allowing the user to access (e.g., play, record, and/or edit) the virtual medium using familiar applications. However, the user may gain a performance advantage working with the virtual medium because the DASD may have faster access times (e.g., read, write, and seek times) than a drive used to access the physical medium.

While the user may want the ability to handle virtual media of the same size as the physical media it represents (e.g., a 4.7 GB DVD), the user may also want to minimize the amount of storage space required on the DASD. For example, the user may not want to tie up 4.7 GB of storage space on the DASD to store 5 MB of data on a relatively small virtual UDF media. However, the user may want the capacity of the virtual UDF media to grow to hold up to the real 4.7 GB if the user has more data to put on this virtual medium. As previously described, however, the capacity of UDF media is typically fixed once the media is formatted and the freespace bitmap field 116 is written. Because each bit of the freespace bitmap field 116 represents a sector of the user data 120, the freespace bitmap field 116 would have to be expanded to represent a larger amount of data. However, if the freespace bitmap field 116 is expanded, the header 110 will be expanded accordingly, and may extend into the user data 120. Therefore, the user data 120 would have to be moved to make room for the expanded header 110, which may require time consuming complex copying operations.

Accordingly, there is a need for an improved method for creating and manipulating UDF data structures having a variable capacity.

SUMMARY OF THE INVENTION

The present invention generally provides methods, computer-readable media, and systems for creating and manipulating UDF data structures having variable capacities.

One embodiment provides a method for formatting a universal disk format (UDF) data structure on a storage medium. The method generally includes creating a freespace bitmap field large enough to represent a first amount of data, setting a value of a freespace bitmap size field according to the size of the freespace bitmap field, and reserving an area adjacent the freespace bitmap field, allowing the freespace bitmap field to expand to represent a second amount of data larger than the first amount of data.

Another embodiment provides a method for copying a universal disk format (UDF) data structure from a first storage medium to a second storage medium, wherein the first and second storage media have different storage capacities, and expanding a freespace bitmap field of the UDF data structure on the second storage medium to represent the capacity of the second storage medium.

Another embodiment provides a computer-readable medium containing a plurality of instructions which, when executed, perform operations for formatting a UDF data structure. The operations generally include creating a freespace bitmap field large enough to represent a first amount of data, setting a value of a freespace bitmap size field according to the size of the freespace bitmap field, and reserving an area adjacent the freespace bitmap field, allowing the freespace bitmap field to expand to represent a second amount of data larger than the first amount of data.

Another embodiment provides a computer-readable medium containing a plurality of instructions which, when executed, perform operations generally including copying a universal disk format (UDF) data structure from a first storage medium to a second storage medium, wherein the first and second storage media have different storage capacities, and expanding a freespace bitmap field of the UDF data structure on the second storage medium to represent the capacity of the second storage medium.

Another embodiment provides a system including a first storage medium having a universal disk format (UDF) data structure stored therein, a second storage medium having a larger capacity than the first storage medium, a processor, and a memory coupled with the processor. The memory contains instructions which, when executed by the processor, cause the processor to copy the UDF data structure from the first storage medium to the second storage medium and expand a freespace bitmap of the UDF data structure according to the capacity of the second storage medium.

Another embodiment provides a universal disk format (UDF) data structure on a first storage medium having a freespace bitmap field sized to represent a first amount of data stored in the data structure, a freespace bitmap size field to indicate a size of the freespace bitmap field, and a reserved area adjacent the freespace bitmap field allowing for expansion of the freespace bitmap field to represent a second amount of data larger than the first amount of data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIGS. 4A and 4B illustrate an exemplary UDF data structure, formatted according to the operations of FIG. 3, before and after expanding a freespace bitmap field to represent a larger capacity of data.

DETAILED DESCRIPTION OF THE PREFERRED EMBODIMENTS

Figure 1:
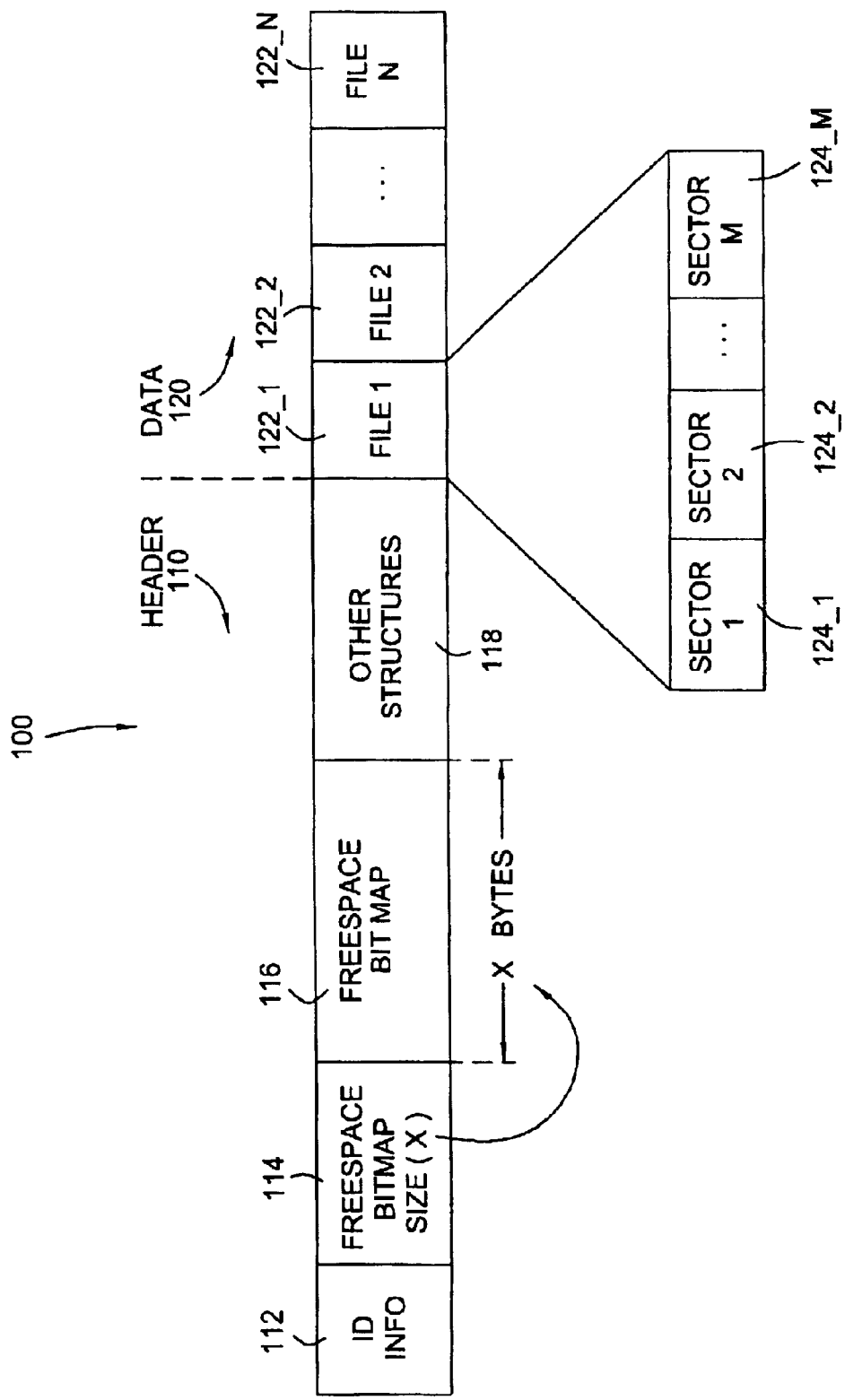
FIG. 1 illustrates an exemplary UDF data structure according to the prior art.

The present invention provides embodiments for creating and manipulating a universal disk format (UDF) data structure having a variable capacity. In one aspect, a UDF data structure having a variable capacity allows for efficient sector copying of data between source and target storage media having different capacities, thereby reducing an amount of time required for the copying when compared to conventional techniques limited to file copying.

Some embodiments of the invention are implemented as program products for use with, for example, the exemplary computer system 200 illustrated in FIG. 2 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices such as CD-ROM and DVD-ROM disks); (ii) alterable information stored on writable storage media (e.g., CD-RW disks, DVD-RW disks, DVD-RAM disks, floppy disks or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention may be implemented within many different computer systems. The invention may be implemented in a computer program product which is adapted for use with any computer. For example, suitable computer systems in which the invention may be used are IBM's iSeries computers, pSeries computers, zSeries computers, etc. Illustrative operating systems which may be used to advantage include IBM's AIX operating system, IBM's OS/390, Red Hat's Linux and Microsoft Corporation's Windows. (IBM, MQSeries, RISC System/6000, PS/2, OS/390, eSeries, iSeries, pSeries, zSeries, and AIX are trademarks of International Business Machines (IBM) Corporation; Red Hat, Linux and Windows are registered trademarks of Red Hat, Inc., Linus Torvalds and Microsoft Corporation, respectively.)

Figure 2:
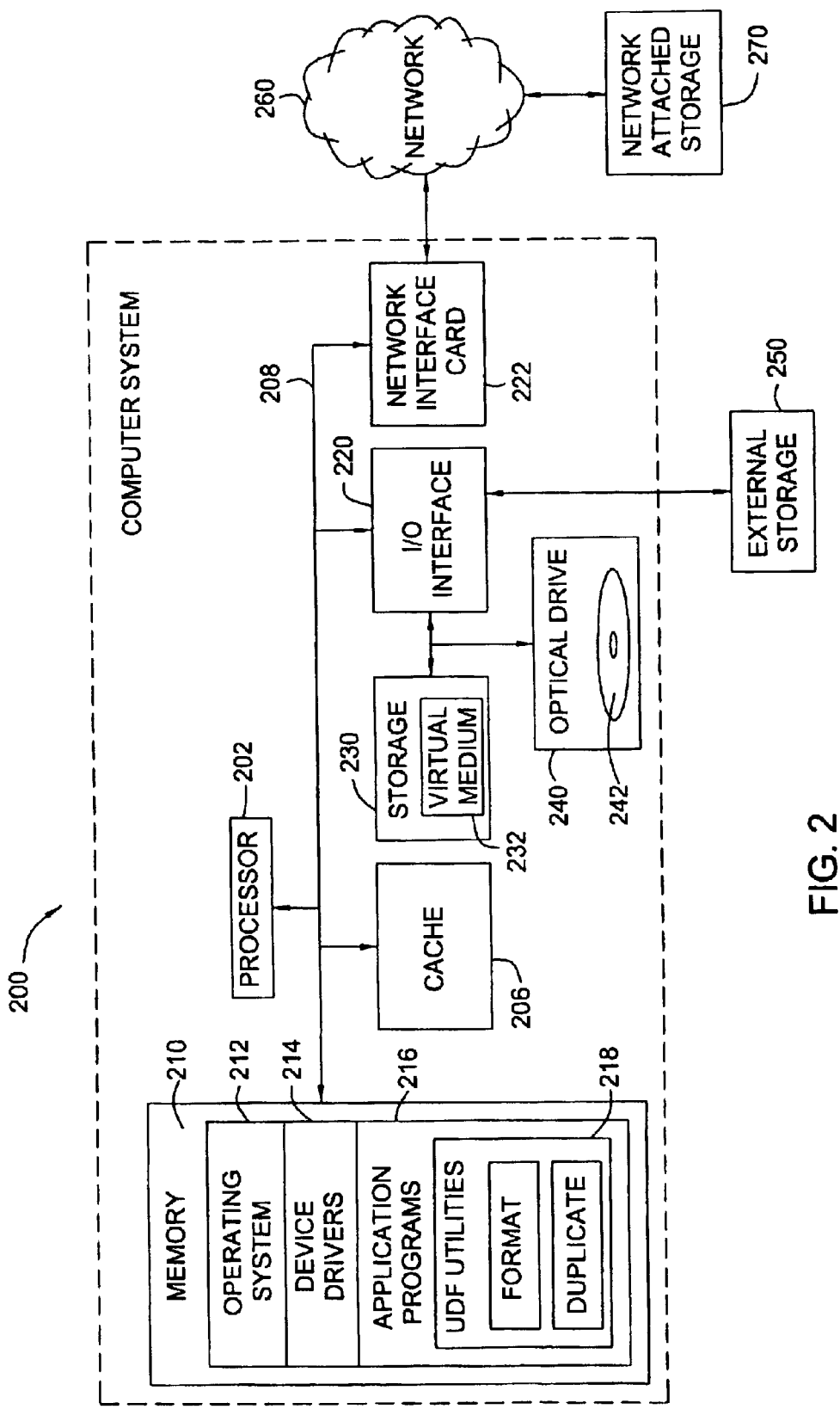
FIG. 2 illustrates an exemplary computer system according to one embodiment of the present invention.

As illustrated in FIG. 2, the computer system 200 generally includes a processor 202, cache 206, a memory 210 and an I/O interface 220 connected by a bus 208. Illustratively, the processor 202 is a PowerPC available from IBM. More generally, however, any processor configured to implement the methods of the present invention may be used to advantage. Further, the computer system 200 may comprise more than one processor 202.

The I/O interface 220 may be used to access a storage device 230, an optical drive 240 and an external storage device 250 by the processor 202 via the bus 208. The computer system 200 may also include a network interface card 222 to communicate with a network 260 (i.e., a LAN, WAN, etc.). The computer system 200 may be able to access a network attached storage device 270 attached to the network 260. For example, the network storage device 270 may be an optical juke box having multiple optical disks for storing data. The multiple optical disks may have a combined capacity of over one Terabyte (i.e., over 1000 GB). Other computer systems may also be attached to the network 260, such as a computer system of a network administrator (not shown).

The storage device 230 may be a direct access storage device (DASD) and, although it is shown as a single unit, it could be a combination of fixed and/or removable storage devices, such as fixed disk drives, floppy disk drives, tape drives, removable memory cards, or optical storage. The memory 210 may also be one or a combination of memory devices, including Random Access Memory, nonvolatile or backup memory, (e.g., programmable or Flash memories, read-only memories, etc.) and the like. In addition, memory 210 may be considered to include memory physically located external to the computer system 200, for example, any storage capacity used as virtual memory or stored on a mass storage device or on another computer coupled to the computer system 200 via the bus 208. Further, the memory 210 and the storage device 230 could be part of one virtual address space spanning multiple primary and secondary storage devices.

As illustrated, a virtual medium 232 may reside on the storage device 230. For example, the virtual medium 232 may appear to have the characteristics of a physical medium, such as an optical disk 242 (e.g., a CD or a DVD). As previously described, an advantage to working with the virtual medium 232 may be an increase in performance. For example, the storage device 230 in which the virtual drive 232 resides may have a much faster access time than a drive (e.g., optical drive 240) used to access the physical medium the virtual drive 232 represents.

The memory 210 may include an operating system 212 and device drivers 214. The memory 210 may further include one or more applications 216 including a set of UDF utility programs 218. The applications 216 and the UDF utility programs 218 are software products comprising a plurality of instructions that are resident at various times in various memory and storage devices in the computer system 200. When read and executed by one or more processors 202 in the computer system 200, the applications 216 and UDF utilities 218 cause the computer system 200 to perform the steps necessary to execute steps or elements embodying the various aspects of the invention.

Application programs 216 may include a variety of applications that create and manipulate UDF data structures. For example, application programs 216 may include application programs that backup data of a computer system or network of computer systems, applications for editing multimedia files (e.g., audio and/or video files), and applications for replicating large amounts of data. According to different aspects of the present invention, application programs 216 may interact with the UDF utilities 218. According to other aspects of the present invention, the UDF utilities 218 may be stand alone utilities.

The UDF utilities 218 may be configured to format and manipulate UDF data structures having variable capacities on various storage media. As used herein, the term storage medium (plural storage media) generically refers to any technology (including devices and materials) used to place, keep, and retrieve data on a temporary or long-term basis. While the UDF may have been created specifically for optical storage media, UDF data structures may be used to advantage on any suitable type storage medium. The UDF utilities 218 may be further described with reference to FIGS. 3 through 7.

Figure 3:
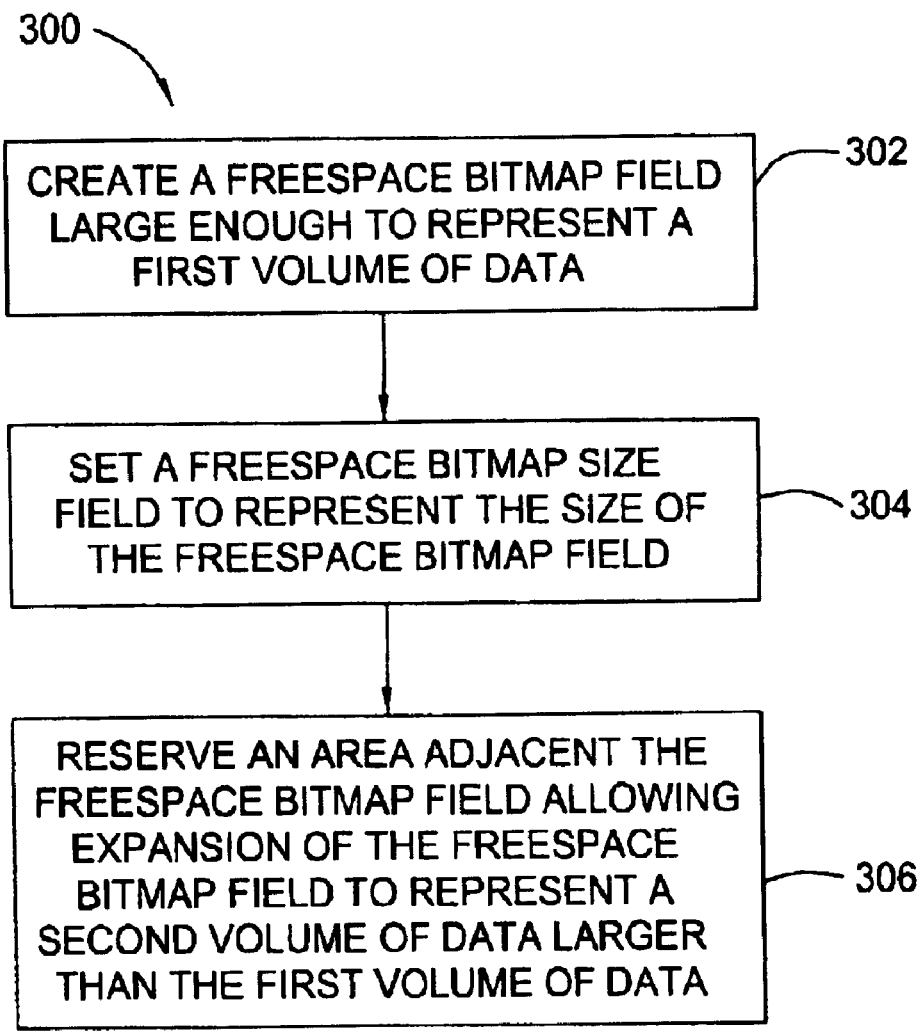
FIG. 3 is a flow diagram illustrating exemplary operations for formatting a UDF data structure according to one embodiment of the present invention.

For example, FIG. 3 is a flow diagram illustrating exemplary operations 300 for formatting a UDF data structure having a variable capacity of data according to one embodiment of the present invention. The method 300 may be described with reference to FIG. 4A which illustrates an exemplary UDF data structure 400 according to one embodiment of the present invention.

Operations 300 begin at step 302 by creating a freespace bitmap field large enough to represent a first amount of data. For example, as illustrated in FIG. 4A, a freespace bitmap 416 may be created to represent the size of user data field 420. As previously described, each bit of the freespace bitmap 416 represents one sector of data in the user data field 420. The size of the user data field 420 may be determined by the capacity of a storage medium on which the data structure 400 is created. For example, the storage medium may be an optical disk, and the size of the user data field 420 may be the size of the optical disk less the amount consumed by formatting overhead (e.g., the header 410).

At step 304, a freespace bitmap size field is set to represent the size of the freespace bitmap field. As previously described, the freespace bitmap size field 414 may represent a size, in bytes, of the freespace bitmap 416. In other words, the value of the freespace bitmap size field 414 may simply be the number of sectors represented by the freespace bitmap field 416 divided by eight.

At step 306, an area adjacent the freespace bitmap field is reserved, allowing for expansion of the freespace bitmap field to represent a second amount of data larger than the first amount of data. For example, an area 430 adjacent the freespace bitmap field 416 may be reserved, wherein the combined space of the freespace bitmap field 416 and the reserved field 430 may be large enough to represent the second amount of data. Therefore, the size of the reserved area 430 may determine a maximum amount of data that the freespace bitmap 416 can be expanded to represent.

The size of the reserved area 430 may be chosen to ensure the freespace bitmap field 416 may be expanded to represent a size of the largest storage medium to which the user anticipates copying the data structure 400. For example, a user creating the data structure 400 on a CD-RAN may anticipate copying the data structure to a standard optical medium of a larger capacity, such as a DVD-R/W or a DVD-RAM. Accordingly, the user may select the reserved area 430 to ensure the freespace bitmap field 416 may be expanded to represent the larger capacity.

Obviously, reserving the area 430 increases the overall size of the header 410 and, therefore, reduces an amount of storage space that may be used for the user data 420. However, the reduction may be a relatively small fraction of the overall amount of storage space. As previously described, each bit of the freespace bitmap 416 generally represents one sector of user data 420. Because a UDF sector is typically 2 k bytes, the overhead of the additional reserved space 430 is only 1 bit for every 2 k bytes of expandable capacity. As an example, to represent a first amount of approximately 560 MB (e.g., a CD-R/W), the freespace bitmap field 416 may be approximately 280K bits (35 K bytes long). To allow the freespace bitmap field 416 to expand to represent a second amount of 4.7 GB (i.e., approximately 8 times the initial volume of 560 MB), the reserved space 430 should allow the freespace bitmap field 416 to expand to be approximately 2.4 Mbits (300 k bytes), which is approximately 0.05% of the total capacity of a 560 MB CD-R/W.

Figure 5:
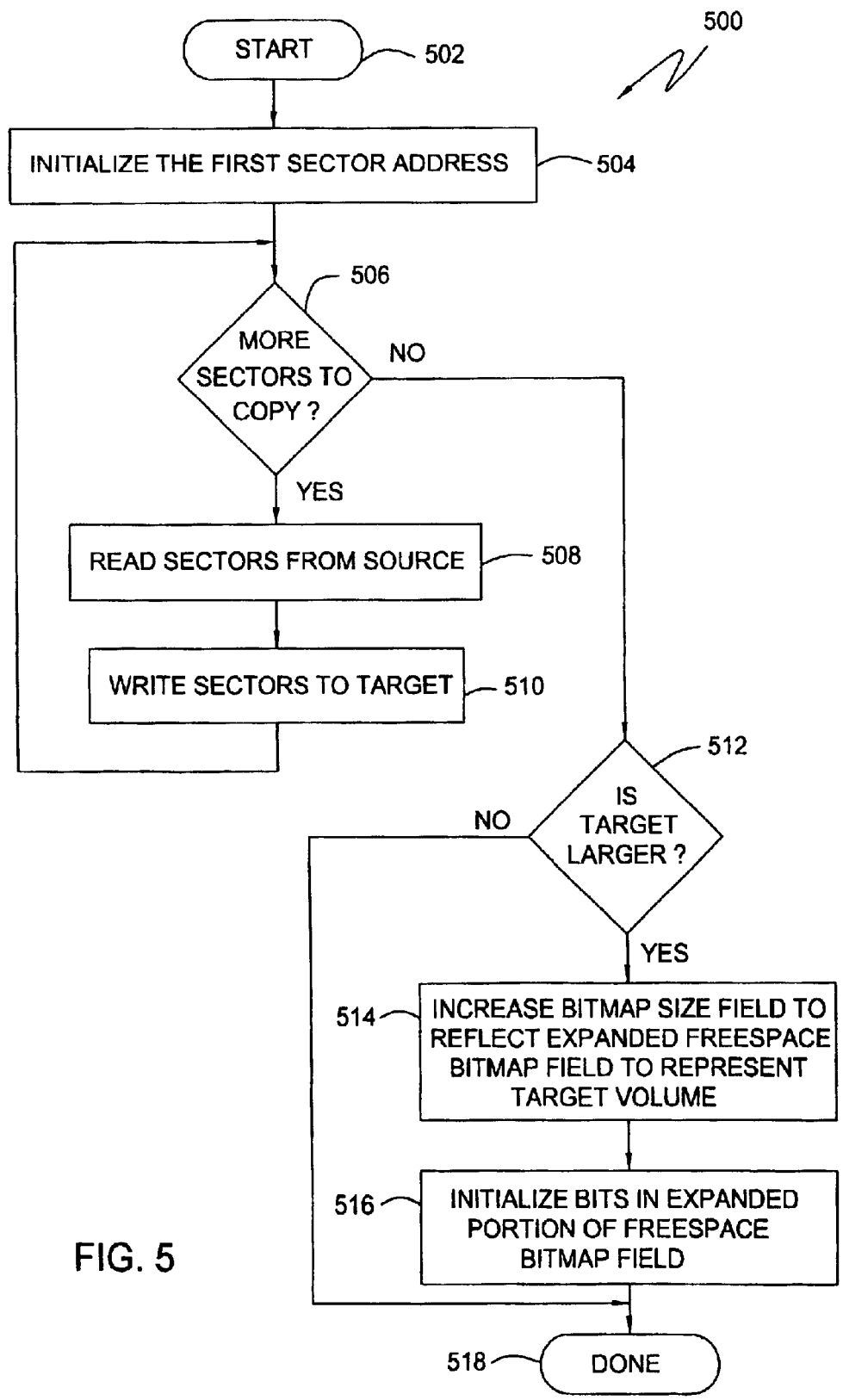
FIG. 5 is a flow diagram illustrating exemplary operations for copying the UDF data structure of FIG. 4A from a source medium to a larger capacity target medium.

FIG. 5 is a flow diagram illustrating exemplary operations 500 for copying the UDF data structure 400 of FIG. 4A from a first storage medium to a second storage medium having a larger capacity using efficient sector copying. The operations 500 may be described with reference to FIG. 4B, which illustrates the UDF data structure 400 after the freespace bitmap field 416 has been expanded to represent a larger amount of data. The method 500 is initiated at step 502.

Steps 504–510 represent sector copying operations. At step 504, a pointer is initialized with the first sector address. Steps 506–510 represent looped operations performed for each sector or group of sectors. At step 506, a test is performed to determine if there are more sectors to copy from the source to the target. If there are, at step 508, one or more sectors are read from the source. At step 510, the one or more sectors are written to the target. As previously described, because sectors are accessed sequentially, and only once, sector copying is generally fast and very efficient. For example, copying an amount of data with sector copying may be more than four times faster than copying the same amount of data via file copying. Once there are no more sectors to copy at step 506, a test is performed, at step 512, to determine if the target medium is larger than the source medium. If the target medium is not larger than the source medium, the routine 500 is exited at step 518.

If the target medium is larger than the source medium, however, the freespace bitmap field is expanded at steps 514–516 to represent an amount of data that may be stored on the larger target medium. At step 514, the freespace bitmap size field is increased to represent an expanded freespace bitmap large enough to represent the amount of data that may be stored on the larger target medium. For example, referring to FIG. 4B, the freespace bitmap size field 414 may be increased from X to X', where X' is the number of bytes needed for the freespace bitmap 416 to represent the size of the target medium. As a result, the freespace bitmap 416 may expand to occupy a portion 432 of the reserved space 430, with a remaining portion 434 reserved for future expansion.

At step 516, bits in the expanded portion of the freespace bitmap field are initialized. For example, bits in the portion 432 of the previously reserved space 430 occupied by the expanded freespace bitmap field 416 may be initialized to an "available" state. The operations of steps 514 and 516 may be performed in any order. For some embodiments, all the bits in the reserved space 430 may be initialized during the formatting operations 300 of FIG. 3. Therefore, initializing the bits at step 516 may not be necessary at all. It should also be noted that, as long as there is reserved space left, the freespace bitmap 416 may be expanded again, to represent a still larger amount of data. Accordingly, the reserved area 430 may be regarded as consisting of multiple reserved areas, and the freespace bitmap may be expanded incrementally, as necessary to represent incrementally larger amounts of data.

For some embodiments, the freespace bitmap field 416 may be expanded (e.g., via steps 514 and 516) prior to copying the data (at steps 504–510). However, performing the sector copying operations prior to modifying the header data may provide an advantage if an error is encountered that makes completion of the copying difficult or impossible. For example, if the freespace bitmap size field 416 is expanded first, the data structure 400 may appear to hold a larger amount of data, but depending on where an error occurs, the amount of data may not really be larger, which may make data recovery difficult because it may not be clear where the copied data ends. On the other hand, if data is copied prior to modifying the header and if an error occurs before completing the operation, the data structure may appear as having a smaller amount of data while residing on a larger capacity medium, but at least the amount of data following the header is logically identified.

For some embodiments, operations similar to the operations 500 may be performed to copy data from a first storage medium to a second storage medium having less capacity than the first storage medium. However, because the second storage medium is of a smaller capacity than the first storage medium, a decision may be made as to what to do with the remainder of the data (i.e., that does not fit on the second storage medium). For some implementations, data may be copied in a sequential manner up to the capacity of the second storage medium. The copying operation may then cease, without copying the remainder of the data. Rather than expand a freespace bitmap, the freespace bitmap may be contracted, for example, by reducing the size of the freespace bitmap size field.

Further, the operations 500 are not limited to copying the data structure 400 of FIG. 4A. For some embodiments, the operations 500 may be utilized to copy a conventional UDF data structure from a source medium to a larger target medium. For example, the UDF specification does not require that a freespace bitmap field actually be in the header area. Therefore, a conventional UDF data structure may be copied from a source medium to a larger target medium, and a new larger bitmap area (outside the header) may be allocated for the freespace bitmap. The existing freespace bitmap may be copied to the new larger area, and the remainder of the new larger bitmap area may be initialized to indicate free space. A field in the UDF data structure indicating a start location of the freespace bitmap may also be updated to indicate the location of the new bitmap area. In other words, the operations 500 may include additional operations for allocating the new larger bitmap area, copying the original freespace bitmap to the new larger bitmap area, and updating the start location of the freespace bitmap. The operations of steps 514 and 516 may then be performed to expand the original freespace bitmap in the new bitmap area.

Thus, according to different aspects of the present invention, an amount of data in a UDF data structure may be efficiently copied from a source medium to a larger target medium using efficient sector copying, with minimal processing overhead to manipulate a header (i.e., adjust the bitmap size field and initialize an expanded portion of the freespace bitmap). Conventionally, the amount of data would have to be copied a file at a time, which may result in unacceptable delays. Thus, the operations 500 may be used to speed a wide variety of processes that require copying a large amount of data, that are conventionally limited to file copying.

For example, the operations 500 may be used during periodic network backup operations. Some or all user data of a network computer system may be stored as a UDF data structure on a first storage medium (e.g., a DASD) located on the network computer system. A network administrator computer system performing backup operations may copy the user data from the first storage medium to a second (larger) network attached storage medium, such as an optical juke box, using efficient file copying, which may reduce backup time dramatically when compared to conventional backup processes utilizing file copying. For example, while backing up 5 GB of data may take over 12 hours using conventional file copying, the same 5 GB of data may be copy in under 3 hours utilizing sector copying.

A UDF data structure having a variable capacity may also be used to an advantage when working with a virtual medium which may reside on another storage medium, such as DASD. As previously described, the virtual medium may represent a physical medium (e.g., a CD or DVD variety). However, a user may want to minimize the amount of DASD space required to store an amount of data much smaller than the capacity of the physical medium represented by the virtual medium. In other words, a user may not want to tie up 4.7 GB of DASD space (e.g., to represent a DVD-R/W) to hold 10 MB of data on a small virtual UDF medium. However, the user may want the virtual medium to grow if the user needs to add more data (e.g., the virtual medium may contain a movie the user is editing, and the user may want to lengthen the movie).

Figure 6A:
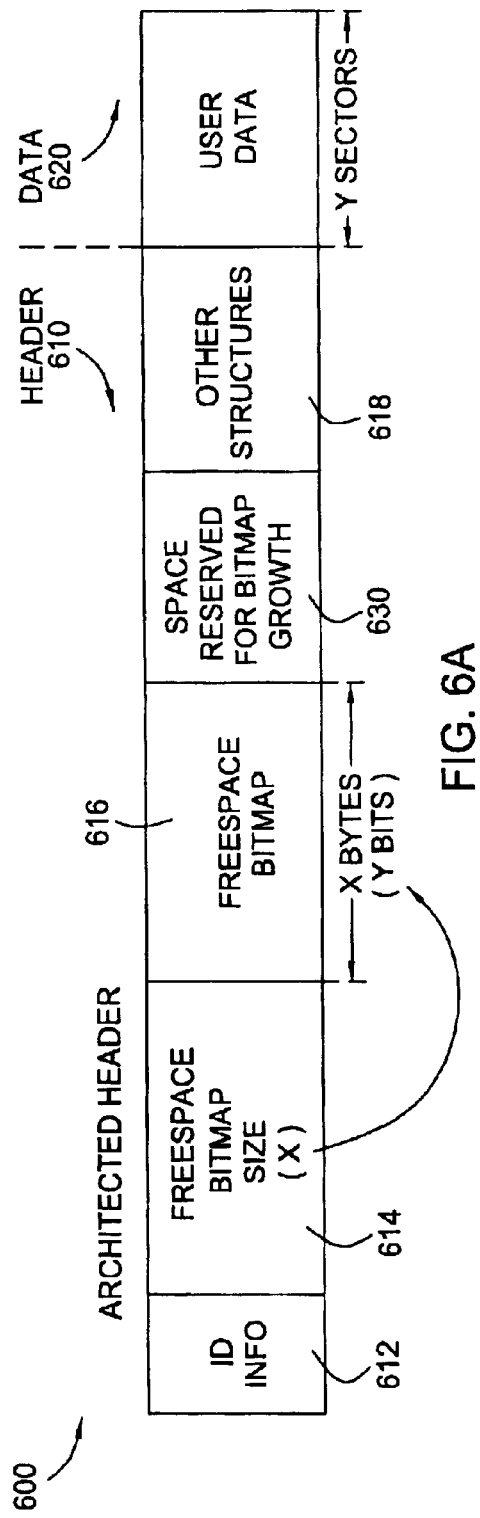
FIGS. 6A and 6B illustrate an exemplary virtual UDF data structure before and after expanding a capacity of a user data field.

FIG. 6A illustrates an exemplary virtual UDF data structure 600 according to an embodiment of the present invention. The virtual UDF data structure 600 may be formatted using the previously described operations 300 of FIG. 3. As illustrated, the virtual UDF data structure 600 may have a freespace bitmap field 616 with a size of X bytes, and a user data field 620 with a size of Y sectors (e.g., Y=8X). The virtual UDF data structure 600 may also have a reserved area 630 to allow for expansion of the freespace bitmap field 616. For example, a size of the freespace bitmap field 616 may be chosen to initially represent a small portion of a capacity of the physical medium represented by the virtual UDF data structure 600, while the reserved area 630 may allow the bitmap field 616 to expand to represent the entire capacity of the physical medium. Further, for some embodiments, the virtual UDF data structure 600 may span more than one physical medium.

Figure 7:
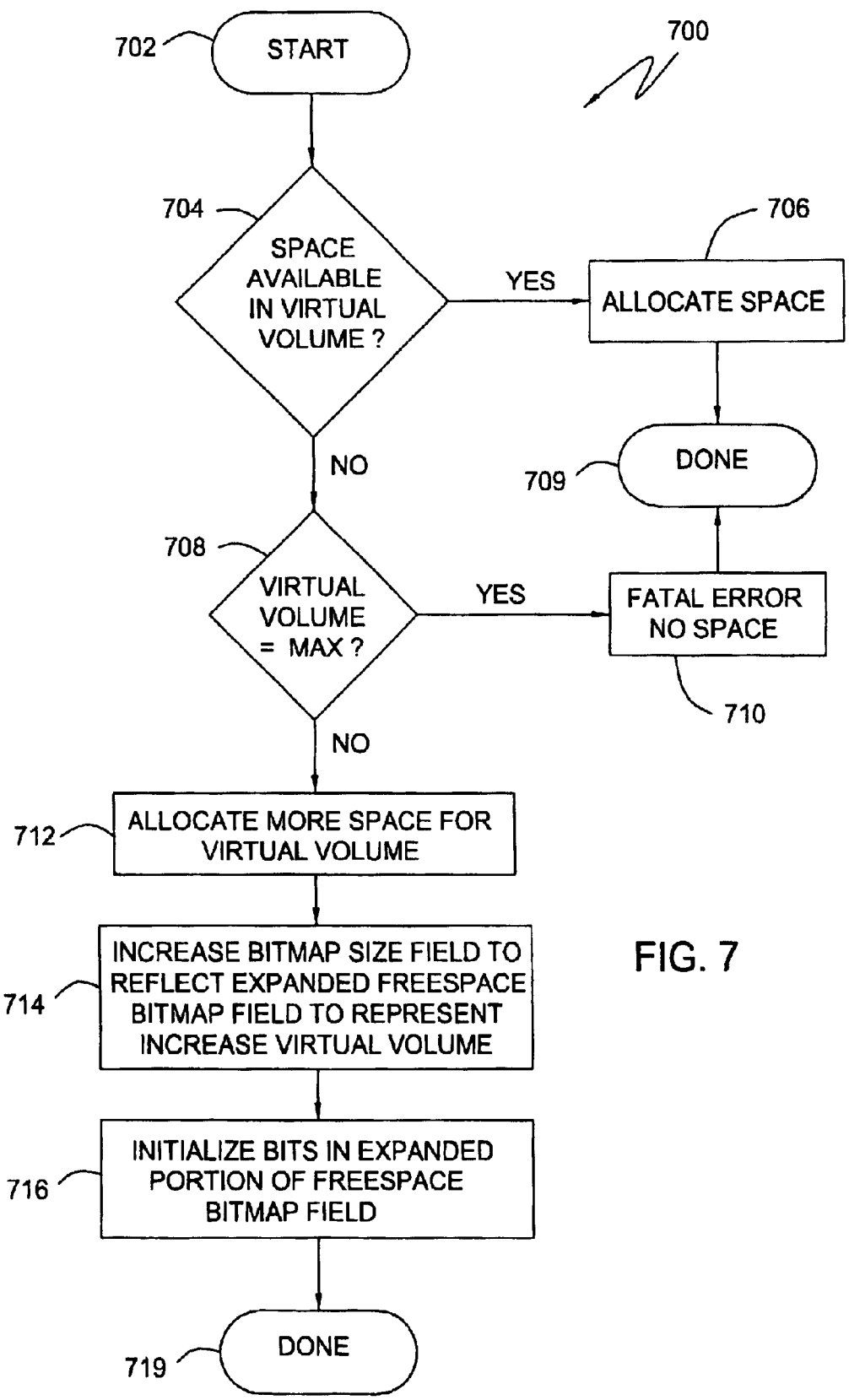
FIG. 7 is a flow diagram illustrating exemplary operations of a method for expanding a capacity of the UDF data structure of FIG. 6A.

FIG. 7 is a flow diagram illustrating exemplary operations 700 for expanding a capacity of the virtual UDF data structure 600 according to one embodiment of the present invention. For example, the operations 700 may be performed when additional data is to be written to the user data field 620. The operations 700 begin at step 702.

At step 704, if there is space available in the virtual UDF data structure, additional space is allocated at step 706 and the operations 700 end at step 709. For example, if there is available space in the user data field 620, that space is allocated and additional data may be written to the user data field 620 without expanding the user data 620.

If there is not space available in the virtual UDF data structure, however, a test is performed at step 708 to determine if the amount of data in the virtual UDF data structure has reached a maximum level. In other words, the test may determine if there is any reserved space 630 remaining to allow for expansion of the freespace bitmap field 616. If the virtual UDF data structure has reached the maximum level (e.g., the freespace bitmap field 616 has expanded to occupy the entire reserved space 630), the freespace bitmap field 616 may not be expanded further and a fatal error indicating no available space is returned at step 710.

If the amount of data in the virtual UDF data structure has not reached the maximum level, however, additional space is allocated at step 712 and the freespace bitmap field is expanded at steps 714–716 to represent the larger amount of user data. In other words, the operations of steps 714 and 716 are analogous to the operations of steps 514 and 516 of FIG. 5.

Figure 6B:
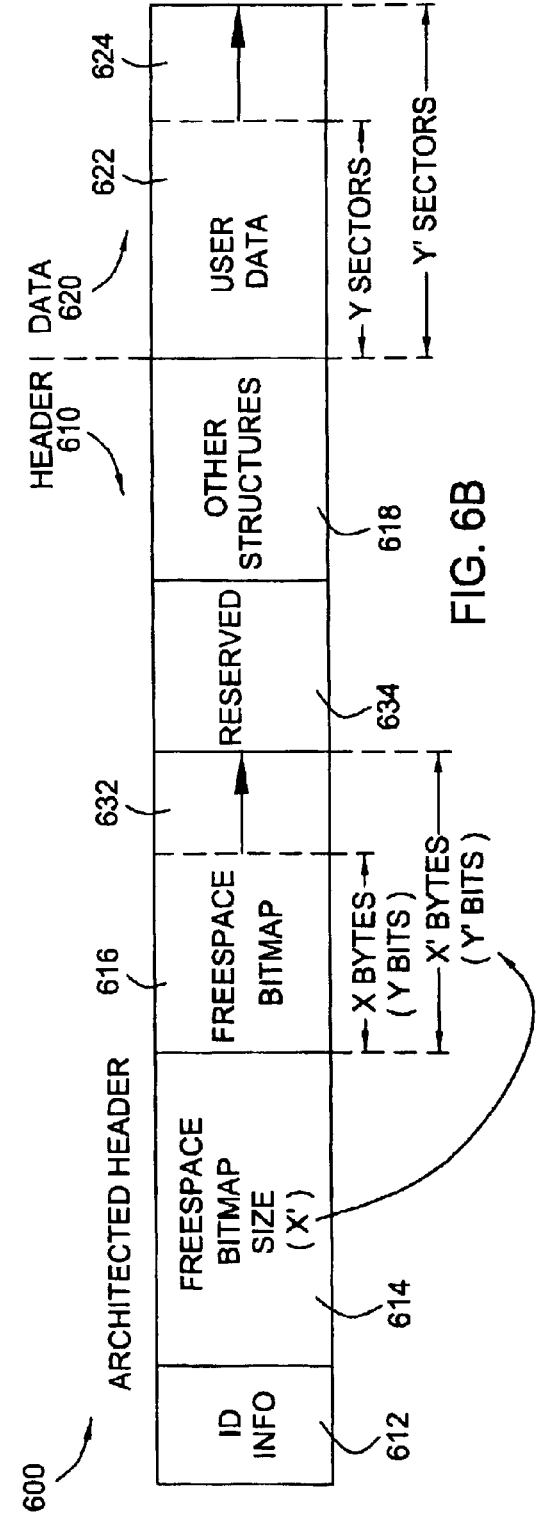

As illustrated in FIG. 6B, the freespace bitmap field 616 and the user data field 620 may be expanded. For example, the expanded freespace bitmap field 616 may have a size of X' bytes, to represent the expanded user data field 620 with a size of Y' sectors (e.g., Y'=8X'). The size of the user data field 620 has been increased from an original portion 622 (X sectors) to include an expanded portion 624. For some embodiments, the operations 700 of FIG. 7 may be performed automatically when a user attempts to write additional data to the user data field 620. For example, a multimedia application may perform the operations automatically when a user increases a size of a multimedia file the user is editing, and the operations 700 may be transparent to a user.

Referring back to FIG. 2, UDF utilities 218 may include utilities for formatting and duplicating UDF data structures. For example, UDF utilities 218 may include one or more different utilities to perform the formatting operations 300 of FIG. 3, the copying operations 500 of FIG. 5, and/or the virtual UDF data structure expansion operations of FIG. 7. For some embodiments, the UDF utilities 218 may include one or more graphical user interface (GUI) screens to facilitate configuring the operations of the utilities.

Figure 8:
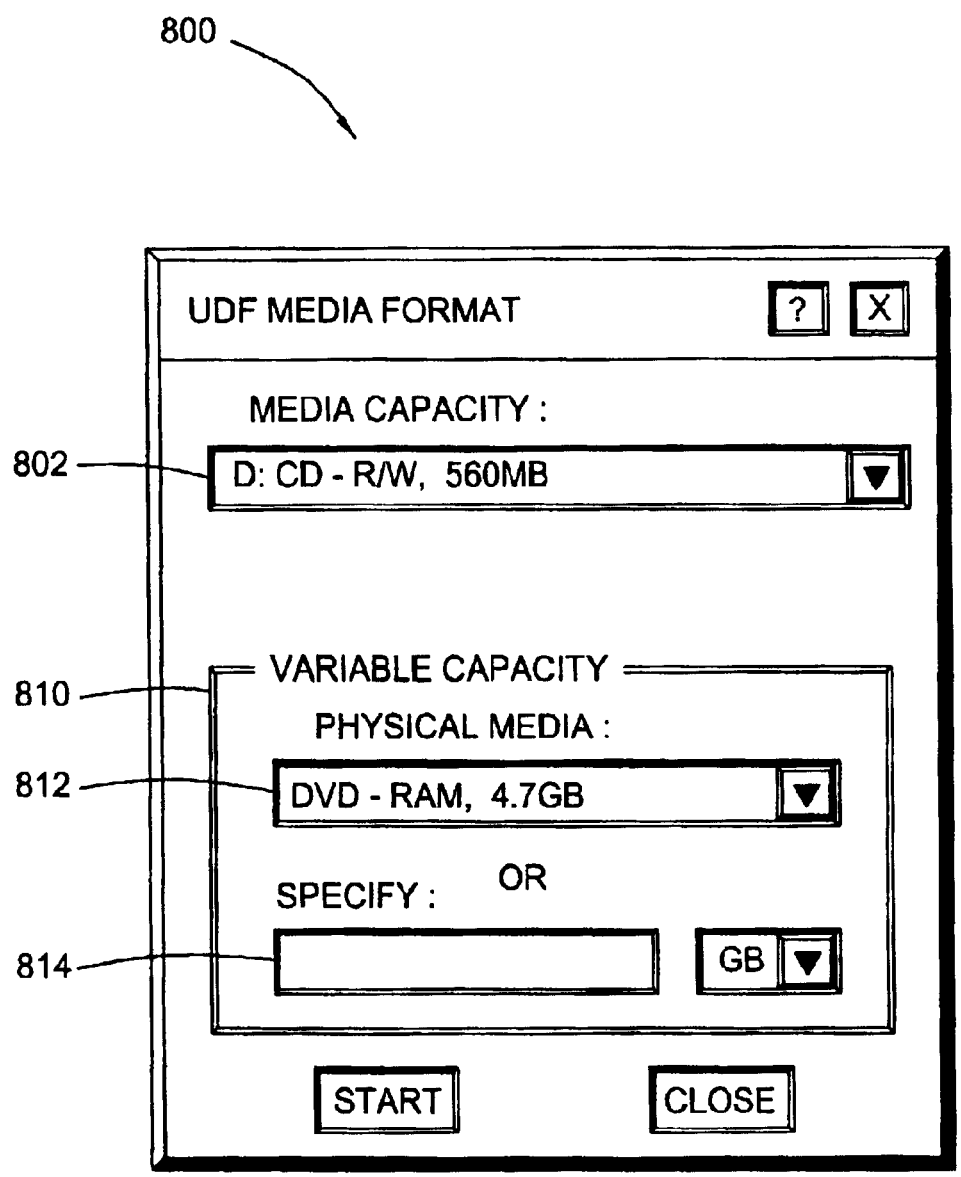
FIG. 8 illustrates an exemplary graphical user interface (GUI) screen for formatting a UDF data structure having a variable capacity.

For example, FIG. 8 illustrates an exemplary GUI screen 800 for formatting a UDF medium. The screen 800 may include a "Media Capacity" pull down menu 802 for selecting an initial capacity of a storage medium to format. As illustrated, the menu 802 may include a list of available media. For example, the list of available media presented in the menu 802 may be chosen according to resources (e.g., CD-R/W drives, DVD-R/N drives, DVD-RAM drives, etc.) available on a computer system running the utility. Further, the list may include various media for a particular media drive. For example, a media drive (such as a DVD-RAM drive) may be capable of handling different storage media with different capacities.

The GUI screen 800 may also include a VARIABLE CAPACITY window 810, allowing a user to select a total amount of data the UDF data structure may be expanded to store. In other words, the MEDIA CAPACITY menu 802 may determine an initial size of the freespace bitmap field, while the VARIABLE CAPACITY window 810 may determine how much the bitmap field may be expanded (e.g., the size of the reserved space). For convenience, the VARIABLE CAPACITY window 810 may include a PHYSICAL MEDIA menu 812 containing a list of standard physical media and capacity (e.g., standard optical media and standard DASD capacities). The VARIABLE CAPACITY window 810 may also include a SPECIFY edit box 814, allowing a user to specify a variable capacity that is not included in the PHYSICAL MEDIA 812 menu.

Accordingly, the user may easily specify a variable capacity, for example, according to a size of a storage medium to which the user anticipates writing the formatted UDF data structure. Based on the information entered via the GUI screen 800, a formatting utility may create a UDF data structure (as illustrated in FIG. 4A) having a properly initialized header, with a freespace bitmap field initialized to represent the specified media capacity, and a reserved area allowing the freespace bitmap field to expand to represent the specified variable capacity.

Figure 9:
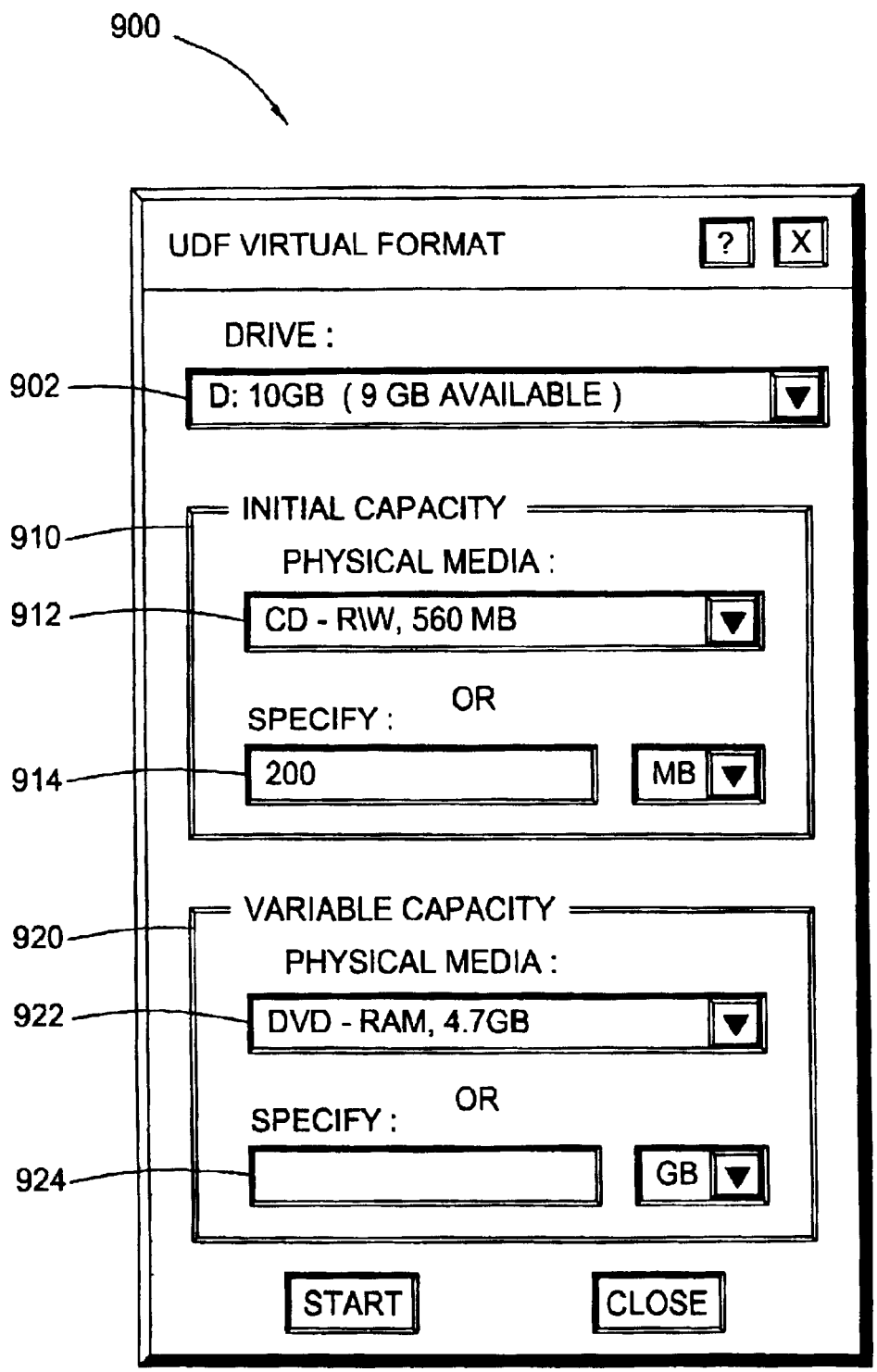
FIG. 9 illustrates an exemplary graphical user interface (GUI) screen for formatting a virtual UDF data structure.

FIG. 9 illustrates an exemplary GUI screen 900 for formatting a virtual amount of UDF data. The screen 900 may include a DRIVE menu 902 for specifying a location (e.g., a DASD) where the virtual UDF data structure will reside. The GUI screen 900 may also include an INITIAL CAPACITY window 910 allowing a user to specify an initial capacity of the virtual UDF data structure via a PHYSICAL MEDIA menu 912 or a SPECIFY edit box 914. The GUI screen 900 may also include a VARIABLE CAPACITY window 920 allowing the user to specify a variable capacity of the virtual UDF data structure via a PHYSICAL MEDIA menu 922 and a SPECIFY edit box 924.

Figure 10:
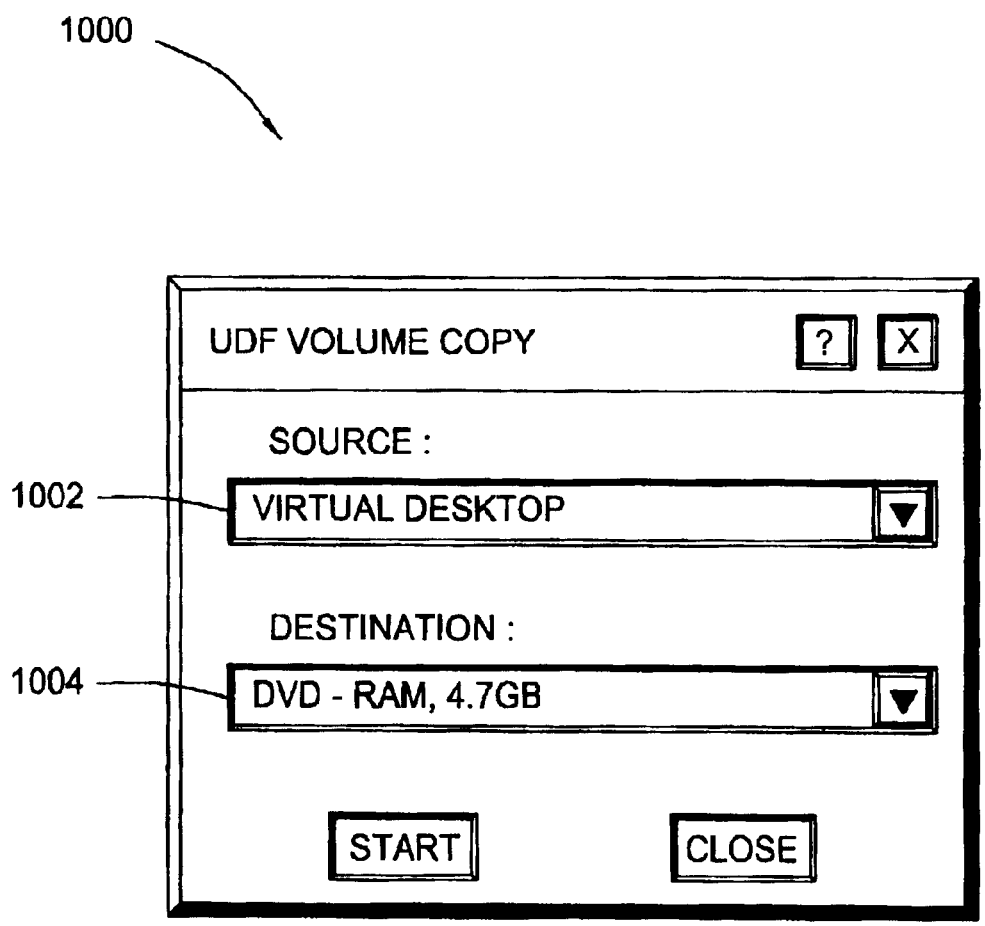
FIG. 10 illustrates an exemplary graphical user interface (GUI) screen for copying a UDF data structure.

FIG. 10 illustrates an exemplary GUI screen 1000 for copying an amount of UDF data from a source medium to a destination, or target, medium. The screen 1000 may include a SOURCE menu 1002 for specifying the source medium. The screen 1000 may also include a DESTINATION menu 1004 for specifying the destination medium. The SOURCE menu 1002 and DESTINATION menu 1004 may each include a list of available virtual UDF formatted media, including virtual, as well as physical UDF formatted media.

As an illustration, a user may specify a UDF formatted virtual desktop, for example, containing a first amount of user data to be backed up, as the source medium via the SOURCE menu 1002 and a DVD-RAM as the destination medium via the DESTINATION menu 1004. When the user presses a START button, a copying utility may perform the previously described operations for copying the amount of data from the virtual desktop to the DVD-RAM. For example, the copying utility may copy the UDF data from the virtual desktop using efficient sector copying and update header and bitmap information to reflect an increased capacity of the DVD-RAM.

Accordingly, embodiments of the present invention provide methods for creating and manipulating UDF data structures capable of storing a variable amount of data. The methods may provide for copying amounts of UDF data between source and target media of different capacities using efficient sector copying, thereby reducing time required for the copying over conventional copying techniques limited to file copying.

While the foregoing is directed to embodiments of the present invention, other and further embodiments of the invention may be devised without departing from the basic scope thereof, and the scope thereof is determined by the claims that follow.

What is claimed is:

1. A computer-implemented method for formatting a universal disk format (UDF) data structure on a storage medium, comprising:

writing to the storage medium to creating a freespace bitmap field large enough to represent a first amount of date stored in the UDF data structure on the storage medium; and writing to the storage medium to reserve an area adjacent the freespace bitmap field, allowing the freespace bitmap field to expand to represent a second amount of data larger than the first amount of data, the second amount of data being stored in the UDF data structure on the storage medium.

2. The method of claim 1, wherein a size of the first amount of data corresponds to a capacity of a standard optical storage medium.

3. The method of claim 1, wherein a size of the second amount corresponds to a capacity of a standard optical storage medium.

4. The method of claim 1, wherein creating a freespace bitmap field large enough to represent a first amount of data comprises setting a value of a freespace bitmap size field.

5. The method of claim 1, wherein the storage medium is a virtual storage medium residing in a direct access storage device (DASD).

6. The method of claim 5, wherein the method further comprises expanding the freespace bitmap field into the reserved area to represent the second amount of data.

7. The method of claim 6, wherein expanding the freespace bitmap field comprises increasing the value of the freespace bitmap size field according to the expanded freespace bitmap field and initializing the expanded portion of the freespace bitmap field.

8. The method of claim 1, further comprising receiving, from a user, sizes of the first and second amounts of data.

9. A computer-implemented method comprising:
copying a universal disk format (UDF) data structure from a first storage medium to a second storage medium, wherein the first and second storage media have different storage capacities; and
writing to the second storage medium to vary a freespace bitmap field of the UDF data structure on the second storage medium according to the storage capacity of the second storage medium.

10. The method of claim 9, wherein the copying comprises sector copying.

11. The method of claim 9, wherein the varying comprises increasing a value of a freespace bitmap size field of the UDF data structure.

12. The method of claim 11, wherein the freespace bitmap field is expanded into an area adjacent the freespace bitmap field reserved for expansion.

13. The method of claim 9, wherein:
the freespace bitmap field is located in a header portion of the UDF data structure on the first storage medium; and
varying the freespace bitmap field of the UDF data structure on the second storage medium comprises copying the freespace bitmap to a non-header portion of the UDF data structure.

14. A computer-implemented method of expanding a size of data represented by a universal disk format (UDF) data structure having a freespace bitmap field to represent a first amount of data, and a reserved area adjacent the freespace bitmap field, and a freespace bitmap size field to indicate a size of the freespace bitmap field, comprising:
increasing a value of the freespace bitmap size field to indicate an expanded size of the freespace bitmap field to represent a second amount of data greater than the first amount of data stored in the UDF data structure, the expanded size of the freespace bitmap field being a sum of the freespace bitmap field representing the first amount of data and at least a portion of the reserved area.

15. The method of claim 14, further comprising initializing a portion of the reserved area adjacent the freespace bitmap size field.

16. The method of claim 14, wherein the freespace bitmap size field and the reserved area adjacent the freespace bitmap size field reside outside a header area of the UDF data structure.

17. A computer-readable medium containing a plurality of instructions which, when executed, perform operations for formatting a UDF data structure, the operations comprising:
writing to the storage medium to create a freespace bitmap field large enough to represent a first amount of data stored in the UDF data structure on the storage medium;
writing to the storage medium to set a value of a freespace bitmap size field according to the size of the freespace bitmap field; and
writing to the storage medium to reserve an area adjacent the freespace bitmap field, allowing the freespace bitmap field to expend to represent a second amount of data larger than the first amount of data, the second amount of data being stored in the UDF data structure on the storage medium.

18. The computer-readable medium of claim 17, wherein the operations further comprise receiving, from a user, a size of the second amount of data.

19. The computer-readable medium of claim 18, wherein the operations further comprising creating a graphical user interface (GUI) screen for receiving, from the user, the size of the second amount of data.

20. The computer-readable medium of claim 19, wherein the GUI screen comprises a menu for selecting the second amount from a list of predetermined amounts.

21. A computer-readable medium containing a plurality of instructions which, when executed, perform operations comprising:
copying a universal disk format (UDF) data structure from a first storage medium to a second storage medium, wherein the first and second storage media have different storage capacities; and
expanding a freespace bitmap field of the UDF data structure on the second storage medium to represent the capacity of the second storage medium.

22. The computer-readable medium of claim 21, wherein the operations further comprise receiving, from a user, parameters specifying the first and second storage media.

23. The computer-readable medium of claim 22, wherein the operations further comprise creating a graphical user interface (GUI) screen allowing the user to specify the first and second storage media from a list of available storage media.

24. A system, comprising:
a first storage medium having a universal disk format (UDF) data structure stored therein;
a second storage medium having a larger capacity than the first storage medium;
a processor; and
a memory coupled with the processor containing instructions which, when executed by the processor, cause the processor to copy the UDF data structure from the first storage medium to the second storage medium and expand a freespace bitmap of the UDF data structure according to the capacity of the second storage medium.

25. The system of claim 24, wherein the first storage medium is an optical storage medium and the second storage medium is a virtual storage medium residing on a direct access storage device (DASD).

26. The system of claim 24, wherein the first storage medium is a virtual storage medium residing on a direct access storage device (DASD) and the second storage medium is an optical storage medium.

27. The system of claim 24, wherein the second storage medium resides on a network attached storage device.

28. The system of claim 27, wherein the processor and the first storage medium are located on different computer systems.

29. The system of claim 28, wherein the processor is located on a network administrator computer system and the instructions are executed as part of a backup operation.

30. A universal disk format (UDF) data structure on a first storage medium, comprising:
- a freespace bitmap field large enough to represent a first amount of data stored in the data structure;
- a freespace bitmap size field to indicate a size of the freespace bitmap field; and
- a reserved area adjacent the freespace bitmap field allowing for expansion of the freespace bitmap field to represent a second amount of data larger than the first amount of data.

31. The data structure of claim 30, wherein the second amount of data is greater than 8 times larger than the first amount of data.

32. The data structure of claim 30, wherein the second amount of data corresponds to a capacity of a standard optical storage medium.

33. The data structure of claim 30, wherein the freespace bitmap field is located in a header portion of the data structure.

* * * * *